(12) United States Patent
Chandrasekharan et al.

(10) Patent No.: US 11,774,627 B2
(45) Date of Patent: Oct. 3, 2023

(54) METHOD FOR CHARACTERIZING A RADIATION SOURCE BY A RADIATION PORTAL MONITORING SYSTEM

(71) Applicant: Arktis Radiation Detectors Ltd., Zurich (CH)

(72) Inventors: Rico Chandrasekharan, Zurich (CH); Ulisse Antonio Gendotti, Zurich (CH); Davide Cester, Zurich (CH); Christoph Philipp, Uster (CH)

(73) Assignee: Arktis Radiation Detectors Ltd., Zurich (CH)

( * ) Notice: Subject to any disclaimer, the term of this patent is extended or adjusted under 35 U.S.C. 154(b) by 160 days.

(21) Appl. No.: 17/415,807

(22) PCT Filed: Dec. 19, 2019

(86) PCT No.: PCT/EP2019/086476
§ 371 (c)(1),
(2) Date: Jun. 18, 2021

(87) PCT Pub. No.: WO2020/127842
PCT Pub. Date: Jun. 25, 2020

(65) Prior Publication Data
US 2022/0137253 A1    May 5, 2022

(30) Foreign Application Priority Data
Dec. 21, 2018   (CH) .................... 01590/18

(51) Int. Cl.
*G01V 5/00*       (2006.01)
*G01T 3/00*       (2006.01)

(52) U.S. Cl.
CPC .............. *G01V 5/0075* (2013.01); *G01T 3/00* (2013.01); *G01V 5/0083* (2013.01); *G01V 5/0091* (2013.01)

(58) Field of Classification Search
CPC .. G01V 5/0075; G01V 5/0083; G01V 5/0091; G01T 3/00
See application file for complete search history.

(56) References Cited

U.S. PATENT DOCUMENTS 10,838,085 B2* 11/2020 Newman ................... G01T 3/00
2005/0029460 A1* 2/2005 Iwatschenko-Borho ..................
                                                G01N 23/00
                                                250/359.1
(Continued)

FOREIGN PATENT DOCUMENTS

EP        2296016 A2      3/2011

OTHER PUBLICATIONS

Woodring, et al., "A Large Detector Laboratory for the Development and Testing of Radiation Detection Systems", IEEE Transactions on Nuclear Science, Apr. 2013, vol. 60, No. 2, pp. 1151-1155.

*Primary Examiner* — David P Porta
*Assistant Examiner* — Casey Bryant
(74) *Attorney, Agent, or Firm* — THE WEBB LAW FIRM

(57) ABSTRACT

A method for characterizing a radiation source by a radiation portal monitoring system is described, the radiation portal monitoring system including a plurality of detectors including radiation detectors configured to detect ionizing radiation of the radiation source and to generate a detection signal responsive to detection of the ionizing radiation, and a control system including at least one processor executing the steps of: assigning an identification address to each detector; selecting a set of at least two detectors using the identification addresses; assigning an effective portal area to the selected set of detectors; receiving via a communication network a detection signal generated by the detectors of the selected set, using the identification addresses of the detectors of the selected set; and characterizing the radiation (Continued)

source associated with the effective portal area using the detection signal of the detectors of the selected set.

18 Claims, 11 Drawing Sheets

(56) References Cited

U.S. PATENT DOCUMENTS

| | | | |
|---|---|---|---|
| 2009/0236538 A1* | 9/2009 | Frank | G01S 19/14 |
| | | | 702/180 |
| 2014/0361186 A1* | 12/2014 | Chandrasekharan | G01T 3/06 |
| | | | 250/391 |
| 2015/0248275 A1 | 9/2015 | Gallo et al. | |
| 2020/0064453 A1* | 2/2020 | Vaello Paños | G01S 17/08 |
| 2022/0137253 A1* | 5/2022 | Chandrasekharan | |
| | | | G01V 5/0075 |
| | | | 250/394 |

* cited by examiner

METHOD FOR CHARACTERIZING A RADIATION SOURCE BY A RADIATION PORTAL MONITORING SYSTEM

CROSS-REFERENCE TO RELATED APPLICATIONS

This application is the United States national phase of International Application No. PCT/EP2019/086476 filed Dec. 19, 2019, and claims priority to Swiss Patent Application No. 01590/18 filed Dec. 21, 2018, the disclosures of which are hereby incorporated by reference in their entirety.

BACKGROUND OF THE INVENTION

Field of the Invention

The present invention relates to a method for characterizing a radiation source, especially of nuclear and/or radiological material in a container, vehicle, and/or on a person, by a radiation portal monitoring system and a radiation portal monitoring system for characterizing a radiation source.

Description of Related Art

Radiation portal monitors (RPMs) are passive, non-intrusive devices for screening objects such as containers, vehicles, persons etc. passing through the RPM and for detecting ionizing radiation, in order to interdict illicit transports of radiological and nuclear materials. RPMs are capable to detect radiological threats such as shielded special nuclear materials (SNMs), e.g. plutonium or highly enriched uranium, and advantageously, to discern these from benign sources of radiation such as Naturally Occurring Radioactive Materials (NORM), medical isotopes, and natural backgrounds. Typical RPMs include detectors with gamma detection capability and detectors with neutron detection capability. Usually, RPMs are installed at borders to monitor traffic crossing the borders, at seaports, in airports, in urban centers, near nuclear facilities, at import/export terminals etc.

An example of an RPM and a method for detecting nuclear and/or radiological material using an RPM is described in WO2014/198537 A1. The RPM comprises at least one detector which is capable of detecting radiation events being interrelated to nuclear or radiological material to be detected, a time stamping unit for assigning each detected radiation event of the at least one detector an individual time stamp, the time stamping unit having an input, which receives signals from the at least one detector and an output being connected to a time analysis unit for analyzing a time pattern received from the time stamping unit with respect to time correlation structures. The at least one detector is connected within the RPM to a signal processing unit, wherein an output of the signal processing unit is connected to the input of the time stamping unit. The time stamping unit, the time analysis unit and the signal processing unit of the RPM are arranged within the RPM or at the RPM.

RPMs as the ones shown in WO2014/198537 A1 can comprise a plurality of radiation detectors which are for example arranged in stationary pillars. An RPM system typically comprises a plurality of RPMs, wherein a pair of pillars forms an RPM lane for monitoring objects passing through the RPM within the RPM lane. Especially at seaports or border crossings, series of RPM lanes can be arranged next to each other such that for example a plurality of trucks can pass through the RPM lanes and can be monitored. Each of the RPM of the RPM system comprises data acquisition units and signal processing units which are assigned to the detectors of the RPM and arranged at the respective RPM.

SUMMARY OF THE INVENTION

While operating RPM systems, acquisition of the detected signals and signal processing as well as alarm decision for the detection of SNM plays an important role. Common RPMs therefore comprise several processing and controller units which are configured to acquire the detection signals, to preprocess and process the detection signals and to perform alarm decision, which processing and controller units have an effect on the complexity and associated efforts on provision and operation of RPM systems.

It is therefore an object of the invention to provide a method for characterizing a radiation source by a radiation portal monitoring system and a radiation portal monitoring system for characterizing a radiation source which at least partially improve the prior art and avoid at least part of the disadvantages of the prior art.

According to the present invention, this object is achieved by the features of the independent claims. In addition, further advantageous embodiments follow from the dependent claims and the description as well as the figures.

According to an aspect of the invention, the object is particularly achieved by a method for characterizing a radiation source, especially of nuclear and/or radiological material in a container, vehicle, and/or on a person, by a radiation portal monitoring system, the radiation portal monitoring system comprising a plurality of detectors including radiation detectors configured to detect ionizing radiation of the radiation source and to generate a detection signal responsive to detection of the ionizing radiation, and a control system comprising at least one processor, the method comprising the processor executing the steps of: assigning an identification address to each detector; selecting a set of at least two detectors using the identification addresses, wherein the set of at least two detectors comprises at least one radiation detector together with at least one further radiation detector or with at least one ancillary sensor of the plurality of detectors; assigning an effective portal area to the selected set of detectors; receiving via a communication network a detection signal generated by the detectors of the selected set, using the identification addresses of the detectors of the selected set; and characterizing the radiation source associated with the effective portal area using the detection signal of the detectors of the selected set.

The detectors can communicate with the control system via the communication network. The communication network may include wired and/or wireless sections. The identification addresses of the detectors advantageously enable the control system to address each detector via the communication network and to receive detection signals or detection data, respectively, from the detectors. Especially, the detectors may each be assigned an individual identification address. The detectors may comprise besides the radiation detectors one or more ancillary sensors such as occupancy sensors or object/person tracking devices, as will be described later. The radiation detectors may comprise neutron detectors and/or gamma detectors.

By selecting a set of at least two detectors, adaptable RPMs can be formed which each comprise the detectors of the selected set and which can be formed depending on the requirements of the characterization of the radiation source, for example depending on the object to be screened, it being for example a truck or a pedestrian. In this context, characterization is understood by the person skilled in the art to comprise, in particular, detection and/or identification and/or discrimination etc. of nuclear and/or radiological material.

In particular, the adaptable RPMs can each exhibit a variable effective portal area within which a radiation source may be characterized, depending on the selected set of the detectors. In particular, the radiation source to be characterized is associated with the effective portal area in that the radiation source may be positioned inside the effective portal area or in a determined relationship to the effective portal area. Compared to the prior art, the portal areas are therefore not anymore required to be fixed to e.g. the lane area between oppositely arranged detectors or pillars comprising the detectors. An adaptable RPM may be formed by the control system grouping the identification addresses of the detectors required to form the respective RPM. After screening an object having passed or being present in the effective portal area of an adaptable RPM, the control system may select another set of detectors to form another adaptable RPM in order to screen another object. Alternatively or in addition, multiple sets of detectors may simultaneously be selected by the control system in order to simultaneously form multiple adaptable RPMs for screening one or more objects passing through the multiple effective portal areas. The portal areas may or may not overlap with each other.

Addressing the detectors using the identification addresses via the communication network and forming adaptable RPMs by grouping the respective identification addresses of the detectors of a respective selected set advantageously allows to perform the processing and analysis of the detection signal or data, respectively, by a centralized control system. In particular, the centralized control system may be arranged remotely from the detectors of the RPMs. Advantageously, only simple preprocessing of the measured raw signal may be performed on-site, i.e. at the detectors and processing of the preprocessed detection signal and analysis of the detection signal or data, respectively, may be relocated to the remote and centralized control system. Since the on-site signal processing and/or data analysis can be reduced or eliminated, the instrumentation required at the detectors can be reduced. Therefore, cost and complexity of the RPM system can be reduced.

Furthermore, adaptively selecting sets of detectors for forming adaptable RPMs advantageously allows to substitute components such as detectors in case of failures. For example, a new set of detectors can be selected in case of failure of a particular detector, by selecting a neighbouring detector temporarily substituting the failed detector.

Optionally, the RPM system may comprise additional instrumentation devices which may be assigned an identification address by the processor of the control system. Selecting a set of detectors may optionally include additionally selecting instrumentation devices to form an adaptable RPM.

In some embodiments, the method further comprises the processor selecting at least two different sets of detectors and characterizing the radiation source includes correlating the detection signals from the radiation detectors of the different selected sets.

A combined readout of different adaptable RPMs formed by the different selected sets of detectors and correlation of the respective detection signals provides the advantage that the signal-to-noise ratio can be increased. Therefore, by selecting at least two different sets of detectors, especially for characterizing the same radiation source, the reliability of characterization may be increased.

In some embodiments, the method further comprises the processor storing a cross-talk matrix with entries representing cross-talk factors of a plurality of radiation detectors and characterizing the radiation source in a respective effective portal area includes weighting detection signals from the radiation detectors using the cross-talk factors of the cross-talk matrix.

Using the cross-talk matrix therefore advantageously allows to parametrize the detectors of a selected set or of different selected sets and to take into account possible crosstalk effects between the detectors.

For example, using the cross-talk matrix is advantageous for a configuration where multiple RPMs, such as multiple pedestrian monitors, are distributed over a certain spatial area, for example in an airport. The cross-talk between the radiation detectors of the multiple pedestrian monitors can be casted into the cross-talk factors of the cross-talk matrix. In case of correlated signals, for example due to background radiation, the cross-talk matrix can be used to generate a veto by the control system, for example if the correlated signals are not consistent with expected detection signals originating from a radiation source passing a certain pedestrian monitor, in consideration of the cross-talk factors of the cross-talk matrix.

The processor may recognize correlated signals due to correlation in time and/or due to correlation in space. For example, correlated signals due to background radiation may be correlated at a given point in time and occur at different detectors. Alternatively or in addition, signals may occur at different points in time and occur at different detectors or at a single detector. Correlated signals occurring at different points in time may be fused by the processor with signals from other peripheral devices. For example, the velocity of a radiation source passing a segmented radiation detector or a series of radiation detectors may be detected by an occupancy sensor and be fused with the correlated signals of the segments of the radiation detector or of the series of radiation detectors, in order to characterize the radiation source. Especially, storing the cross-talk matrix may include storing position information of the radiation detectors and/or detector-type information as part of the cross-talk factors.

For example, including position information as part of the cross-talk factors advantageously allows to take into account that the detection signal generated by the radiation detectors may decrease with distance of the radiation detector from the site of the radiation source.

Furthermore, known ranges of detection signal strength depending on the detector-type can also be taken into account by the cross-talk factors.

In some embodiments, the method further includes characterizing a background radiation from correlated signals of radiation detectors of multiple selected sets.

For example, background radiation may be characterized by a correlated signal of radiation detectors of multiple selected sets which exhibits a similar overall strength for the detectors of the different selected sets. The control system may apply a background radiation rejection algorithm by selecting multiple different sets of radiation detectors and identifying correlated patterns in the detection signals indicating background radiation. Characterizing background radiation may be especially advantageous in combination with using a cross-talk matrix, as described above.

While characterizing a background radiation, the processor may set an expected alarm threshold below which the control system would recognize a detection signal as originating from background radiation.

The expected alarm threshold may also be stored in the control system from empirically known background radiation values recorded by the control system.

In some embodiments, characterizing a background radiation includes characterizing an anomaly in the detected background radiation signal and using the anomaly to generate an alarm or a warning to a user of the RPM system.

Characterizing an anomaly in the detected background radiation signal may include detecting a drift and, in particular, a continuous increase of the background radiation signal initially recognized as natural background signal due to the signal strength lying below the alarm threshold. The continuous increase may occur slowly, i.e. over a large time scale compared to time scales of typical detection signals due to localized and/or moving radioactive material detected in an RPM. For example, a person carrying illicit material may approach and pass an RPM with a sufficiently slow speed for simulating a natural background radiation increase.

However, an anomaly may be detected by a drift or continuous increase of the background radiation signal and/or energy distribution being localized to a certain RPM.

A source of background radiation may be natural backgrounds, such as cosmic radiation, stationary radioactive material being in the range of detection of the RPM system, for example naturally occurring radioactive material resting in a nearby premises or under the surface, etc.

A source of background radiation may be for example a mobile X-ray scanner which is for example often deployed in ports. Activating the mobile X-ray scanner may cause the radiation detectors of the RPM system to generate a detection signal which may lead to an alarm. By using the correlated signals of radiation detectors of multiple selected sets, a veto for the X-ray scanner can be generated by the control system, classifying the detection signal from the X-ray scanner as background radiation and preventing to generate a false alarm.

In some embodiments, the method further comprises preprocessing the detection signal, preferably by a microcontroller arranged at the detectors, wherein preprocessing the detection signal includes digitization of the detection signal of the detectors.

By digitizing the analog detection signal, detection data can be produced which can be used for processing and data analysis by the control system.

In some embodiments, characterizing the radiation source by the control system includes processing detection signals by the processor by executing the following steps: a. Acquisition of, preferably preprocessed, detection signal of a radiation detector of the selected set, b. Acquisition of, preferably preprocessed, detection signal of an ancillary sensor of the selected set, c. Fusion of the detection signals of a. and b. and generation of an alarm information, d. Displaying the alarm information on a user console.

Selecting a set of detectors including at least one radiation detector and at least one ancillary sensor provides the advantage that the detection signal of the ancillary sensor, such as an occupancy sensor, can complementarily be used to characterize the radiation source. In particular, the detection signal of a radiation detector of the selected set and the detection signal of an ancillary sensor of the selected set can be fused by the control system to obtain additional information about the radiation source and to generate an alarm information. Especially, fusion may include the processes of spatial and/or temporal correlation, comparison, addition, subtraction, integration, etc. of the respective signals and/or data, respectively. For example, an occupation sensor as an ancillary sensor may be used to verify that an object is present in the current effective portal area of the adaptable RPM formed by the selected set of detectors. The detection signal of the occupation sensor indicating the presence of the object, such as a truck may be fused with the detection signal of a radiation detector of the selected set of detectors by the control system in that the control system may assign and compare the detection signal of the occupation sensor with the detection signal of the radiation sensor and identify that the detection signal originates from a radiation source associated with the object present in the current effective portal area.

In a further example, a number plate recognition device including a camera, may be used as an ancillary sensor to identify the number plate of a truck present in a current effective portal area. By comparing number plate data stored in a database, the control system may decide whether the truck is expected to carry cargo with radioactive material, as will be described in further detail later.

Optionally, the detection signal of an ancillary sensor may also be fused with the detection signal of another, for example neighbouring, ancillary sensor.

The user console may comprise In the context of the present invention, displaying may be understood as any form of information representation, in particular and for example visible, acoustic, haptic etc. representation.

In some embodiments, selecting the set of at least two detectors includes selecting detectors, especially radiation detectors, to form a pedestrian portal area or a traffic portal area.

For example, a pedestrian portal area or an adaptable pedestrian RPM, respectively, may be formed by selecting radiation detectors of neighbouring RPM lanes in a RPM system having a series of RPM lanes for trucks and vehicles, such that the pedestrian portal area may be arranged between two neighbouring pillars of two different, but consecutive RPM lanes.

Therefore, the space between neighbouring RPM lanes may also be used for screening pedestrians.

A further example of forming pedestrian portal areas may be a distribution of radiation detectors over a certain spatial area such as an airport or in urban centers, where the emergence of passing pedestrians may not be constantly distributed over the considered area. Therefore, pedestrian portal areas may be formed for defined areas of interest where a large appearance of pedestrians may occur over a limited time frame.

In some embodiments, assigning an identification address to each detector includes assigning an Internet Protocol address, especially a private Internet Protocol address, to each detector. Therefore, each detector of the RPM system can be designed to be IP-addressable and the data or the detection signal, respectively, may be delivered based on the Internet Protocol. The communication network may therefore be the internet.

According to a further aspect, the present invention is also directed to a radiation portal monitoring system for characterizing a radiation source, especially of nuclear and/or radiological material in a container, vehicle, and/or on a person, the radiation portal monitoring system comprising:
  a plurality of detectors including radiation detectors configured to detect ionizing radiation of the radiation source and to generate a detection signal responsive to detection of the ionizing radiation, the detectors each comprising a circuit configured for communication via a communication network;

a control system configured to establish a communication connection to the detectors via the communication network and comprising at least one processor configured to: assign to each detector an identification address; select a set of at least two detectors using the identification addresses, wherein the set of at least two detectors comprises at least one radiation detector together with at least one further radiation detector or with at least one ancillary sensor of the plurality of detectors; receive via the communication network a detection signal generated by the detectors of the selected set, using the identification addresses of the detectors of the selected set; assign an effective portal area to the selected set of detectors; and to characterize the radiation source in the effective portal area using the detection signal of the detectors of the selected set.

Advantageously, the control system may comprise or be a remotely arranged computer system. As described above, the remotely arranged computer system allows to centralize the control of the RPM system such that signal processing and/or data analysis can be relocated to the remotely arranged computer system.

In particular, the control system may comprise or be a cloud-based computer system.

By using a cloud-based computer system as a control system, the analysis of the detection signals or the detection data, respectively, can be virtualized in that the access to the detection data is not anymore bound to the on-site RPMs and data analysis can remotely be performed. Thus, a so-called Virtual Radiation Portal Monitoring System may be established. The communication network may therefore be the internet. In particular, persons or parties other than on-site RPM technicians may obtain the possibility to access and to process the detection data.

For example, a truck supposed to carry NORM, such as e.g. Potassium, may pass an effective portal area of the RPM system. Since the truck is supposed to carry NORM, the truck should not be stopped in the RPM, provided the truck is not hiding illicit material. Using a selected set of detectors including a number plate recognition device (such as an automatic number plate recognition (ANPR) system) and a radiation detector, a logistics operator of a logistics company accessing the control system through the cloud-based computer system can fuse the detection signal of the number plate recognition device with the detection signal of the radiation detector of the selected set by first retrieving the number plate data in a database and obtaining information about the specific NORM supposed to be carried by the truck, for example by retrieving a transport check associated with the number plate. Second, the logistics operator can compare the information about the NORM obtained from the database with the detection signal from the radiation detector. If the detection signal from the radiation detector indicates a radiation source in the truck which is in accordance with the expected content carried by the truck, an alarm can be avoided and the truck allowed to pass the RPM. If the detection signal of the radiation detector indicates a radioactive material different from that the truck is supposed to carry according to the entries in the database, an alarm may be generated and the truck be stopped. The described processing, fusion and analysis of the detection signals or data, respectively, can be performed by an operator of the logistics company using the cloud-based computer system from remote.

In some embodiments, the radiation portal monitoring system comprises a hub, a switch or a router arranged at the detectors and configured to communicate with the circuits of the detectors and the processor of the control system via the communication network.

In some embodiments, the detectors are arranged to form a series of stationary radiation portal monitor areas, each of the stationary radiation portal monitor area comprising at least two, preferably oppositely arranged, radiation detectors, and wherein the processor is configured to select the set of at least two detectors from the same stationary radiation portal monitor area or from different stationary radiation portal monitor areas. The series of stationary portal monitor areas may for example be a series of RPM lanes or distributed RPMs over a certain spatial area such as for example an airport or at urban centers.

In some embodiments, the radiation portal monitoring system comprises at least one ancillary sensor which is selected from at least one of: occupancy sensor, light detection and ranging (LIDAR) sensor, speed control sensor, weight sensor, especially cargo weight sensor, environmental sensor, especially temperature sensor and/or humidity sensor, power consumption sensor, door tampering sensor.

The detection signal of an ancillary sensor may be used by the control system to generate an alarm. For example, the detection signal of a door tampering sensor may be used to determine whether unauthorized access to an RPM is performed. Upon the detection of door tampering, for example, the control system may examine a database where maintenance information about the RPM is stored. If a maintenance is foreseen for the respective RPM at the current time, according to the maintenance information, the control system may conclude that the access is authorized and suppress the generation of an alarm. If a maintenance is not foreseen according to the maintenance information, the control system may conclude that the access is unauthorized and generate an alarm which may be displayed in a user console of e.g. an RPM technician.

According to a further aspect, the present invention is also directed to a computer program product comprising a non-transient computer-readable medium having stored thereon computer program code configured to control a processor of a control system of a radiation portal monitoring system for characterizing a radiation source, especially of nuclear and/or radiological material in a container, vehicle, and/or on a person, the radiation portal monitoring system comprising a plurality of detectors including radiation detectors configured to detect ionizing radiation of the radiation source and to generate a detection signal responsive to detection of the ionizing radiation, the computer program code being configured to control the processor such that the processor performs the steps of:

assigning an identification address to each detector;

selecting a set of at least two detectors using the identification addresses, where-in the set of at least two detectors comprises at least one radiation detector together with at least one further radiation detector or with at least one ancillary sensor of the plurality of detectors; assigning an effective portal area to the selected set of detectors;

receiving via a communication network a detection signal generated by the detectors of the selected set, using the identification addresses of the radiation detectors of the selected set; and characterizing the radiation source in the effective portal area using the detection signal of the detectors of the selected set.

BRIEF DESCRIPTION OF THE DRAWINGS

The present invention will be explained in more detail, by way of exemplary embodiments, with reference to the schematic drawings, in which.

DETAILED DESCRIPTION OF EXEMPLARY EMBODIMENTS

Figure 1:
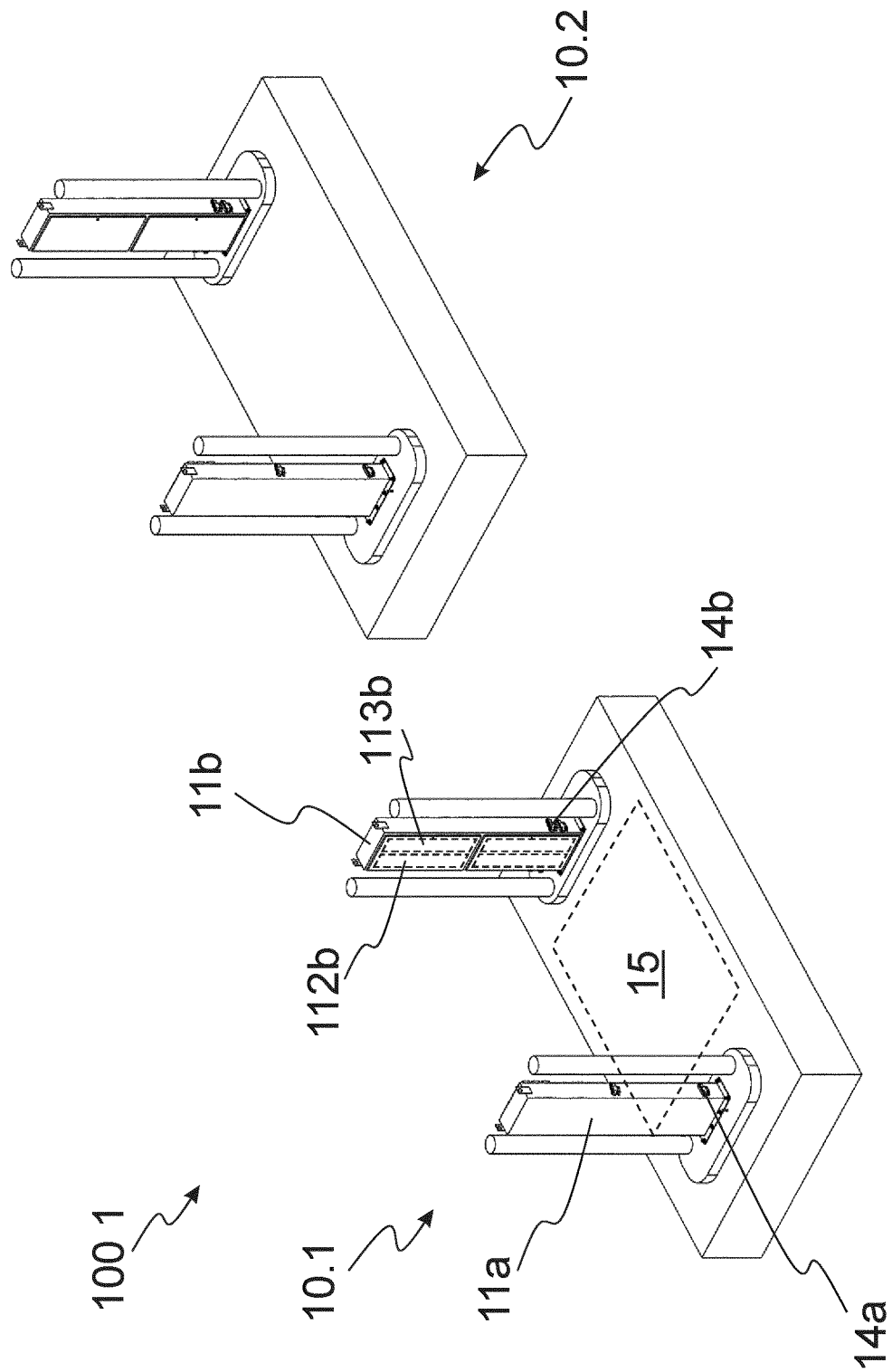
FIG. 1 shows an illustration of two RPMs arranged next to each other.

For the purposes of illustrating the invention, exemplary embodiments are shown in the drawings, in which like numerals represent similar or corresponding, but not necessarily same, parts throughout the different exemplary embodiments.

FIG. 1 shows an illustration of two conventional RPMs 10.1 and 10.2 arranged next to each other and being part of an RPM system 100.1. The RPMs 10.1 and 10.2 are designed in an analogous fashion such that only the RPM 10.1 will be described in further detail for sake of simplicity. The description relating to RPM 10.1 can therefore likewise be applied to the RPM 10.2. The RPM 10.1 comprises two oppositely arranged pillars 11*a*, 11*b* which define a portal area 15 for passing objects to be screened, such as trucks. The pillars 11*a* and 11*b* contain detectors and instrumentation, such as for example a neutron detector 112*b* and a gamma detector 113*b* which are arranged in a housing of the pillar 11*b*. Further, the RPM 10.1 comprises ancillary detectors in the form of occupancy sensors 14*a* and 14*b*, which are used to detect the presence of an object in the portal area 15. The RPMs 10.1 and 10.2 of the RPM system 100.1 are designed to screen objects which are present or are passing between the respective pillars of the RPMs 10.1 and 10.2. However, in the shown configuration, objects passing between the RPM 10.1 and the RPM 10.2 are not screened.

Figure 2:
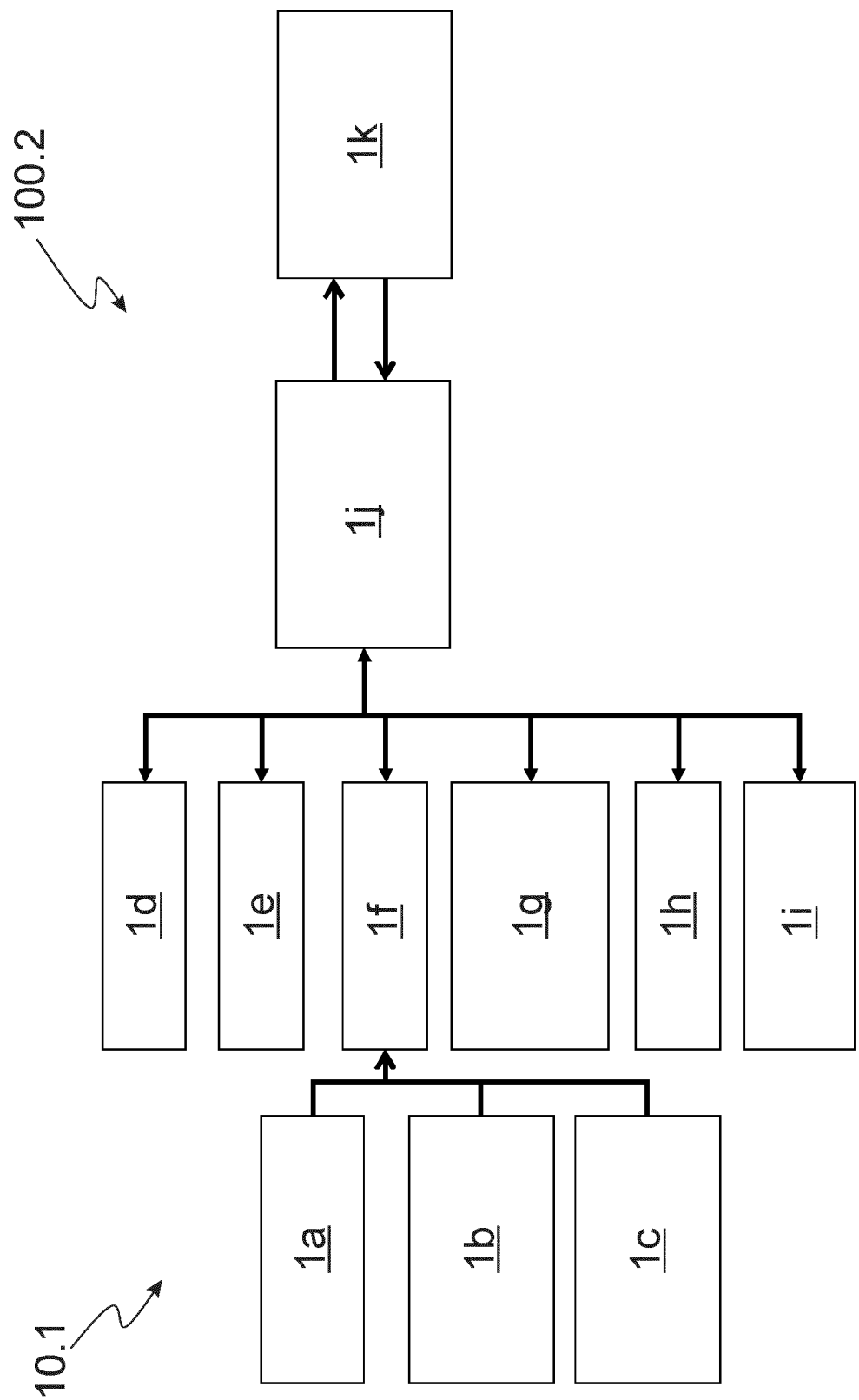
FIG. 2 shows a block diagram of components of an RPM system.

FIG. 2 shows a block diagram of components of an embodiment of an RPM system 100.2. The RPM system 100.2 comprises an RPM 10.1 with environmental sensors 1*a* such as humidity sensors, temperature sensors etc., occupancy sensors 1*b* such as light barriers and other peripheral devices 1*c*, such as object or person tracking systems. The environmental sensors 1*a*, occupancy sensors 1*b* and other peripheral devices 1*c* are connected to a digital and analog I/O-device 1*f*. The RPM 10.1 further comprises a gamma detector 1*d*, a neutron detector 1*e*, an uninterruptable power system (UPS) 1*g*, a camera 1*h* and other directly IP addressable peripheral devices 1*i*. The gamma detector 1*d*, the neutron detector 1*e*, the digital and analog I/O-device 1*f*, the UPS 1*g*, the camera 1*h* and the other directly IP addressable peripheral devices 1*i* are addressable through an Ethernet switch or switching hub 1*j* which communicates with a remote control system in the form of a computer system 1*k*. The gamma detector 1*d*, the neutron detector 1*e*, the digital and analog I/O-device 1*f*, the UPS 1*g*, the camera 1*h* and the other peripheral devices 1*i* are each assigned an identification address in the form of an IP address and are therefore directly IP addressable by the computer system 1*k*. In some embodiments, the environmental sensors 1*a*, occupancy sensors 1*b* and other peripheral devices 1*c* may each be assigned an identification address and directly be addressable by the computer system 1*k*.

Figure 3:
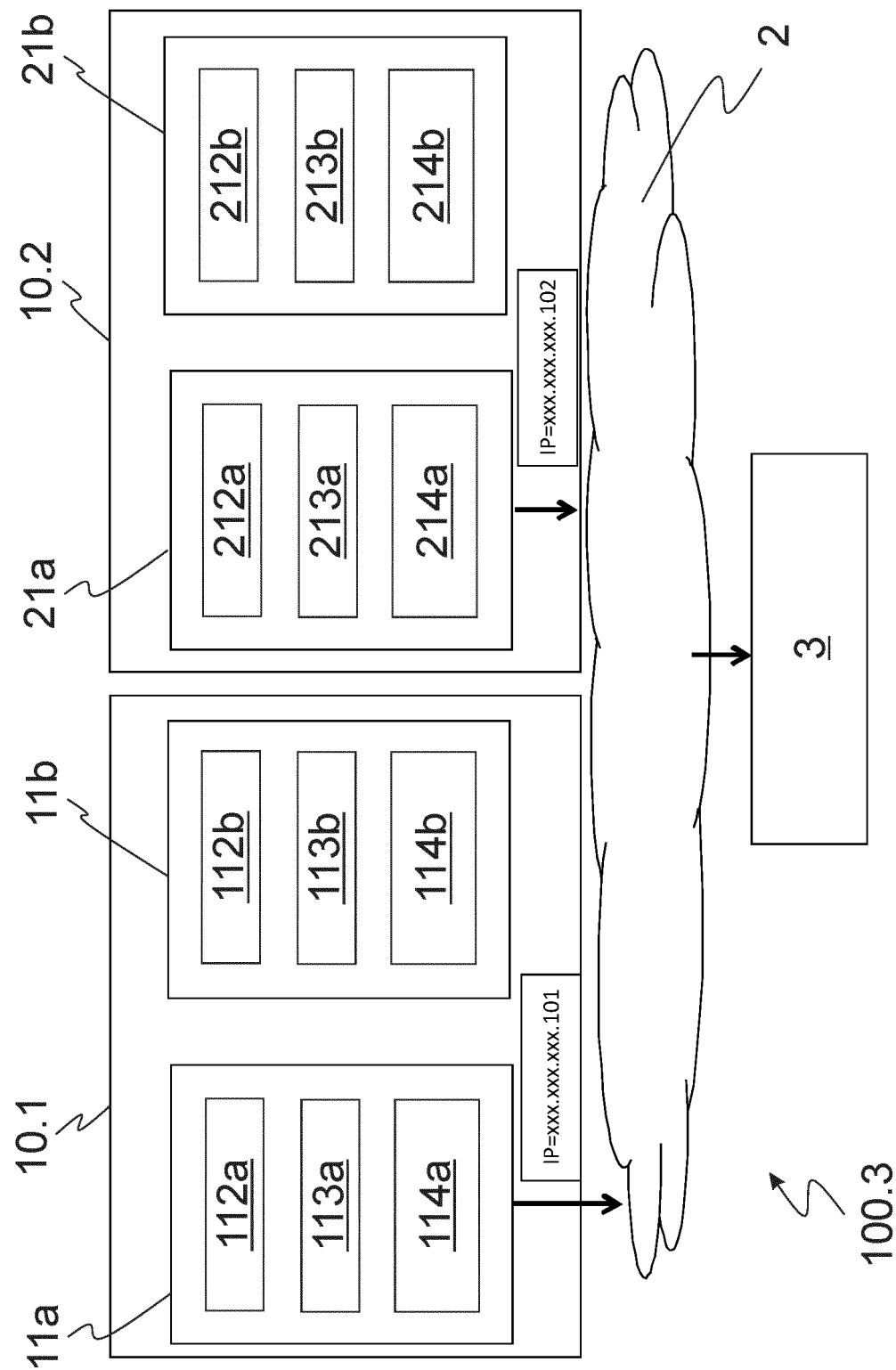
FIG. 3 shows a block diagram of an RPM system.

FIG. 3 shows a block diagram of a conventional RPM system 100.3 comprising an RPM 10.1 and an RPM 10.2. The RPM 10.1 comprises a first unit 11*a* with components 112*a*, 113*a* and 114*a* and a second unit 11*b* with components 112*b*, 113*b* and 114*b*. The components can be radiation detectors and/or ancillary sensors and/or further instrumentation devices such as microcontrollers. Accordingly, the RPM 10.2 comprises a first unit 21*a* with components 212*a*, 213*a* and 214*a* and a second unit 21*b* with components 212*b*, 213*b* and 214*b*. The RPM 10.1 and the RPM 10.2 are each assigned an IP address (e.g IP=xxx.xxx.xxx.101 or IP=xxx.xxx.xxx.102) by which they can be addressed by a control system 3 which communicates with the RPMs 10.1 and 10.2 via a communication network 2. The IP addresses may be e.g. IPv4 (Internet Protocol Version 4) or IPv6 (Internet Protocol Version 6) addresses. The RPMs 10.1 and 10.2 are stationary in that they define stationary portal areas and the control system 3 is configured to process the detection signals according to the stationary portal areas as defined by the RPMs 10.1 and 10.2.

Figure 4:
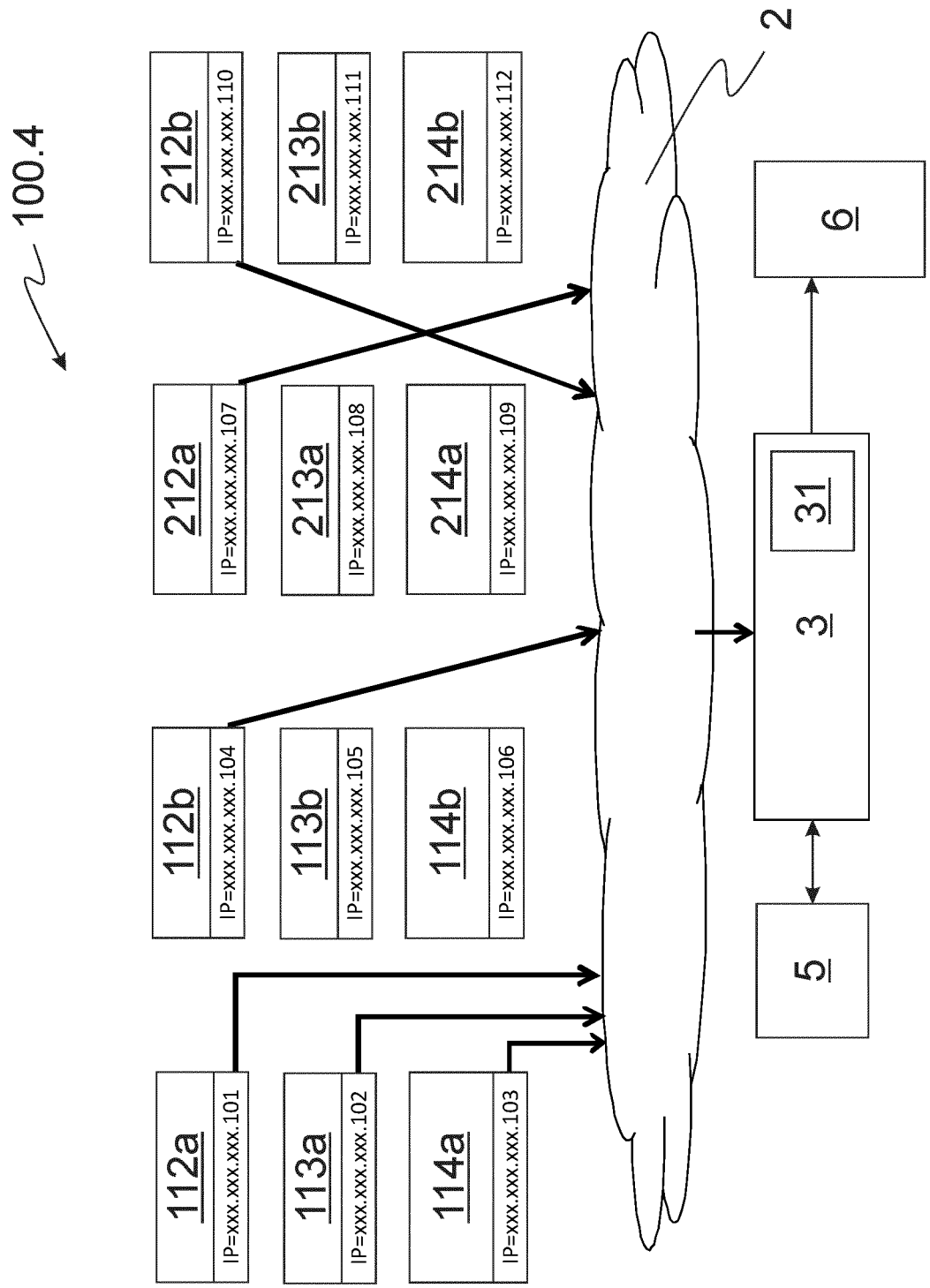
FIG. 4 shows a block diagram of an embodiment of an RPM system with IP-addressable components.

FIG. 4 shows an embodiment of an RPM system 100.4 with components 112*a*-114*a*, 112*b*-114*b*, 212*a*-214*a*, 212*b*-214*b* which are each assigned an identification address in the form of an IP address (IP=xxx.xxx.xxx.101-112). Each component 112*a*-114*a*, 112*b*-114*b*, 212*a*-214*a*, 212*b*-214*b* is independently addressable by a processor 31 of the control system 3 via the communication network 2, such as the internet, using the IP addresses of the components 112*a*-114*a*, 112*b*-114*b*, 212*a*-214*a*, 212*b*-214*b*. Compared to the RPM system 100.3 of FIG. 3, the plurality of components 112*a*-114*a*, 112*b*-114*b*, 212*a*-214*a*, 212*b*-214*b* which may be radiation detectors and/or ancillary sensors, such as occupancy sensors, light detection and ranging (LIDAR) sensors, speed control sensors, weight sensors, especially cargo weight sensors, environmental sensors, especially temperature sensors and/or humidity sensors, power consumption sensors, door tampering sensors and/or further instrumentation devices, are not anymore fixed to stationary RPMs but represent an aggregation of components of the RPM system 100.4, out of which sets of at least two detectors can be selected by the processor 31 of the control system 3 to form adaptable RPMs with effective portal areas assigned to the selected sets of detectors.

Especially, a selected set of at least two detectors comprises at least one radiation detector together with at least one further radiation detector or with at least one ancillary sensor of the plurality of detectors. For example, the processor 31 of the control system 3 may process detection signals of the detectors 112*a/b*-114*a/b*, 212*a/b*-214*a/b* by fusing a detection signal of a radiation detector, for example of a radiation detector 112a and a detection signal of an occupancy sensor 112b, in that the processor 31 of the control system 3 retrieves cargo information about the screened object in a database 5 according to the detection signal of the occupancy sensor 112b, for example a number plate recognition device, and comparing the cargo information stored in the database 5 with the detection signal of the radiation detector 112a. If the detection signal of the radiation detector 112a is in accordance with the cargo information associated with the detection signal of the occupancy sensor, as stored in the database 5, an alarm can be avoided. In case of a deviation, an alarm can be generated by the processor 31 of the control system 3 and the alarm information can be displayed on a user console 6.

Figure 5:
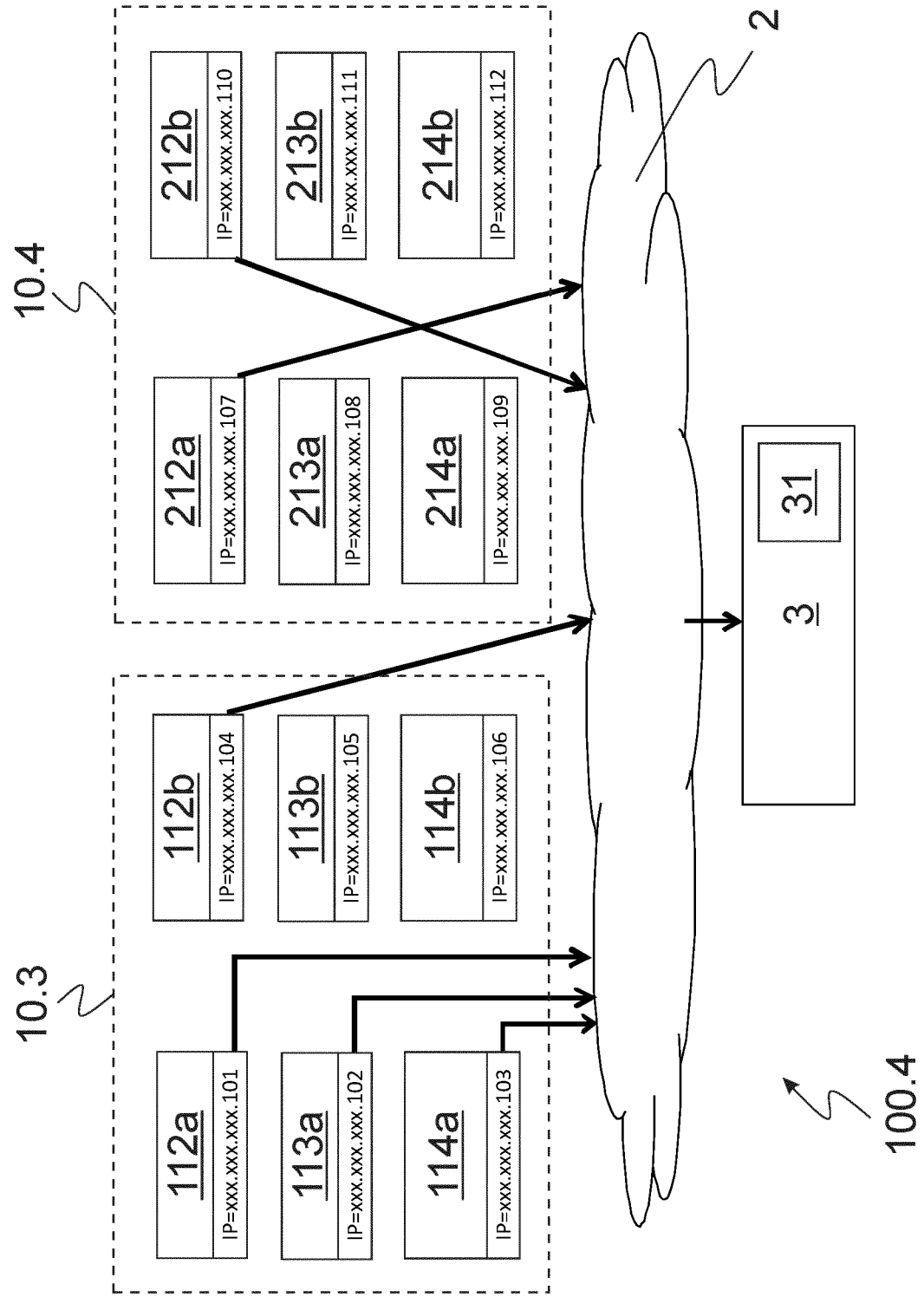
FIG. 5 shows a block diagram of the RPM system of FIG. 4 with selected sets of detectors.

FIG. 5 shows the RPM system 100.4 of FIG. 4 with two selected sets 10.3 and 10.4 of components 112a/b-114a/b, 212a/b-214a/b of the RPM system 100.4. The first selected set 10.3 includes the components 112a/b-114a/b which may be radiation detectors and/or ancillary sensors. The second selected set 10.4 includes the components 212a/b-214a/b which may be radiation detectors and/or ancillary sensors. In variants, some of the components 112a/b-114a/b, 212a/b-214a/b may also be additional instrumentation devices. Therefore, the selected sets 10.3 and 10.4 represent adaptable RPMs 10.3 and 10.4 which are obtained by selecting the respective sets of components. Each selected set 10.3 and 10.4 each assigned an effective portal area. For example, if the components 112a and 112b are radiation detectors, the effective portal area of the selected set 10.3 or the adaptable RPM 10.3, respectively, is positioned in the space between the radiation detectors 112a and 112b. The selection of the sets 10.3, 10.4 and therefore the definition of the adaptable RPMs is performed by the processor 31 of the control system 3, which may be a remote computer system, especially a cloud-based computer system which communicates with the components 112a/b-114a/b, 212a/b-214a/b of the RPM system 100.4 via the communication network 2, which may be the internet.

Figure 6:
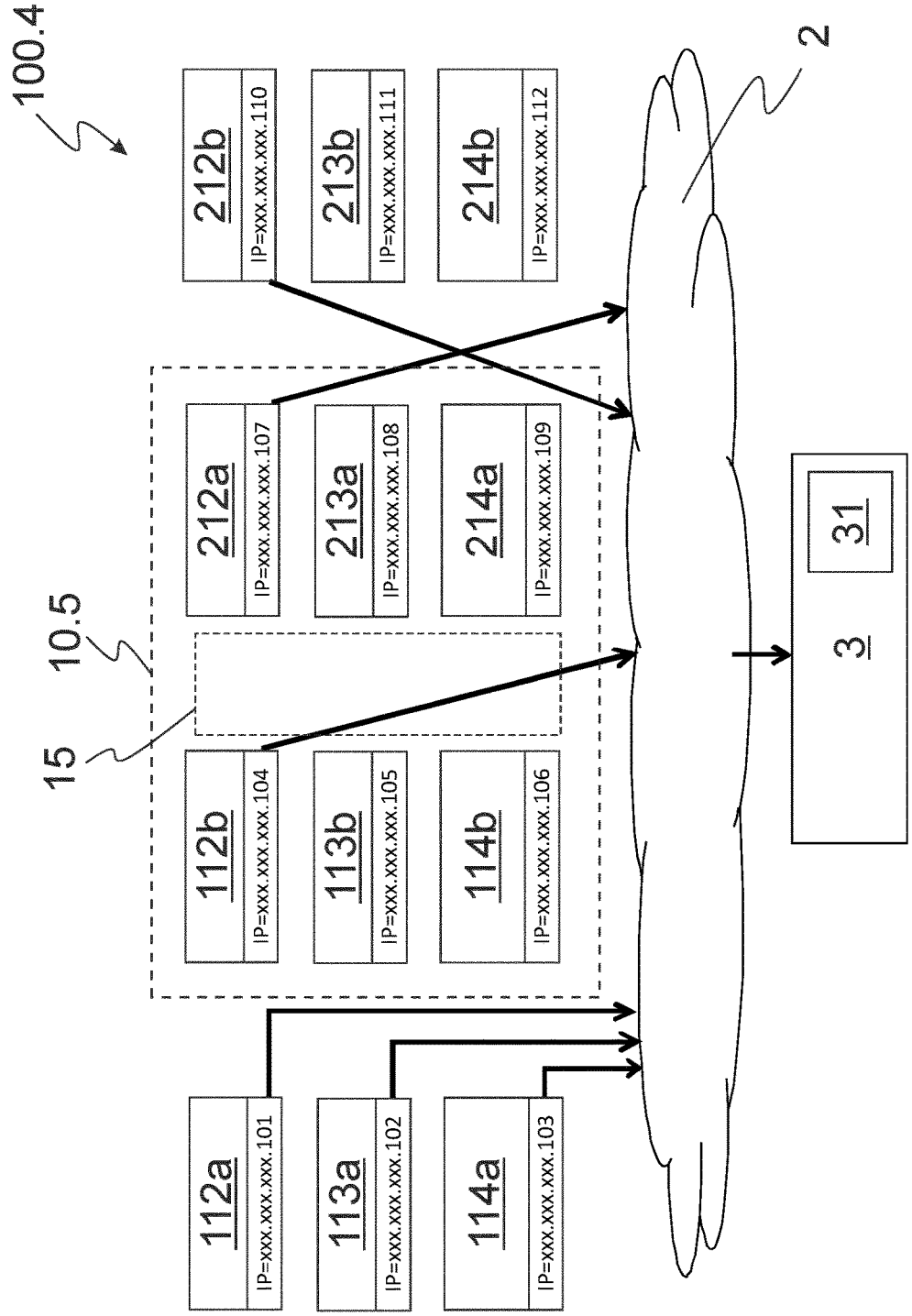
FIG. 6 shows a block diagram of the RPM system of FIG. 5 with a further selected set of detectors.

FIG. 6 shows the RPM system 100.4 of FIG. 5 with a further selected set 10.5 where the processor 31 of the control system 3 has grouped the components 112b-114b and 212a-214a to form a further adaptable RPM 10.5. For a series of RPM lanes, as shown for example in FIG. 1, the processor 31 of the control system 3 could assign to the adaptable RPM 10.5 an e.g. pedestrian portal area 15 being arranged between two different but neighbouring RPM lanes. The adaptable RPMs 10.3, 10.4 and 10.5 as shown in FIGS. 5 and 6 can simultaneously be defined by the processor 31 of the control system 3. By defining a cross-talk matrix with entries representing cross-talk factors of those of the components 112a/b-114a/b, 212a/b-214a/b which are radiation detectors, radiation sources in the respective effective portal areas of the adaptable RPMs 10.3, 10.4 and 10.5 can be characterized by weighting the detection signals from the involved radiation detectors using the cross-talk factors.

The detectors of a selected set do not have to be adjacent to each other. For example, the components 112a, 113a and 114a as well as the components 212b, 213b and 214b may be selected to form an adaptable RPM with a large effective portal area positioned in the center. Thus, using the IP addressable components 112a/b-114a/b, 212a/b-214a/b of the RPM system 100.4, the processor 31 of the control system 3 can select sets of components to form adaptable RPMs in a highly flexible fashion, depending on the current requirements of the detection.

Figure 7:
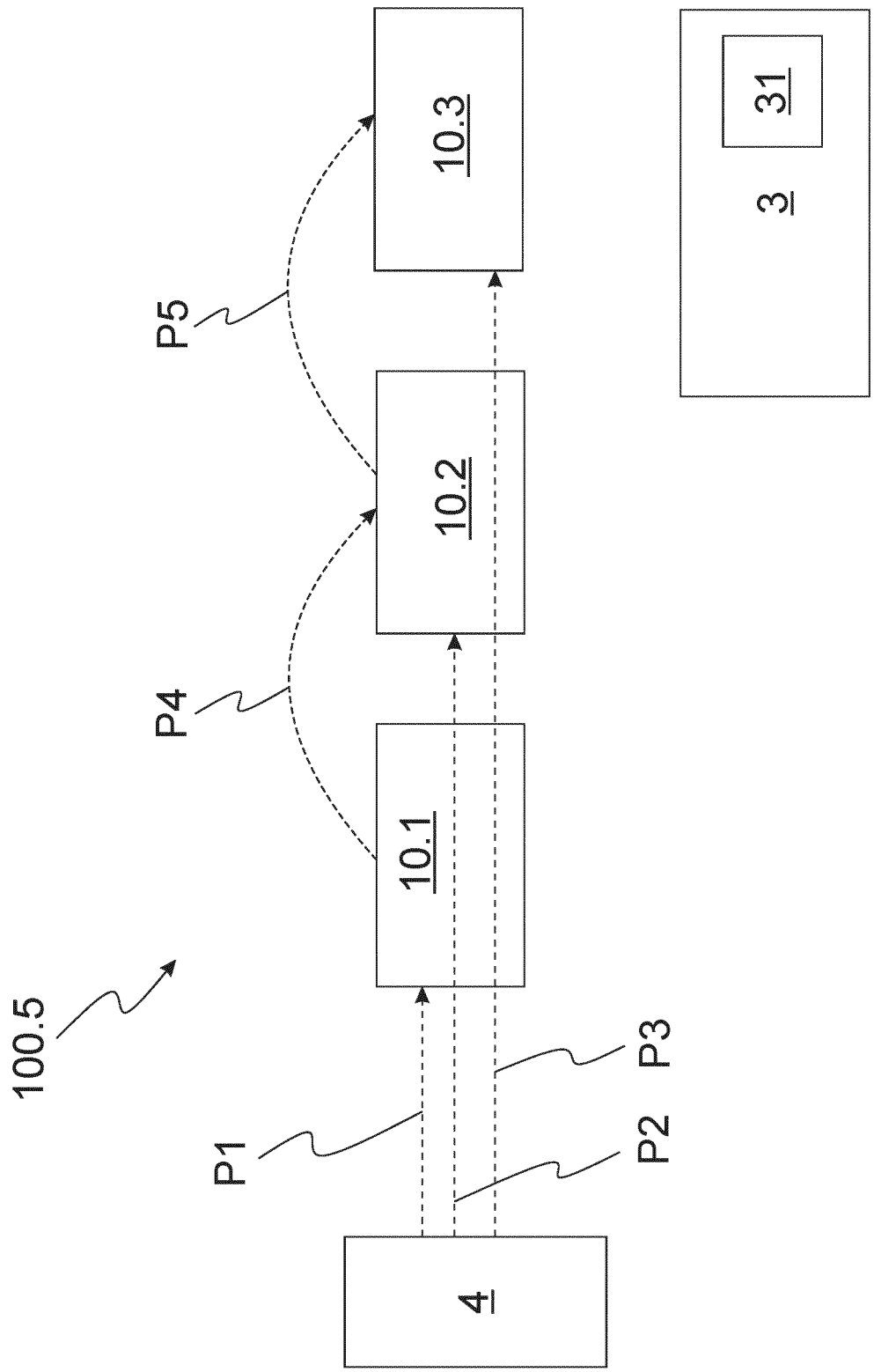
FIG. 7 shows an embodiment of an RPM system with a background radiation source.

FIG. 7 shows an embodiment of an RPM system 100.5 with a background radiation source 4, which may be an X-ray scanner. The RPM system 100.5 comprises RPMs 10.1, 10.2 and 10.3 with portal areas, which may be stationary or may be formed by selecting three different sets of each at least two detectors. The curved arrows P4 and P5 symbolize the first order correlation between the detectors of the RPMs 10.1, 10.2 and 10.3 which can be taken into account by appropriate cross-talk factors of a cross-talk matrix. Second order correlation between non-adjacent adaptable RPMs are not shown in FIG. 7 for simplicity. Using the cross-talk matrix, a processor 31 of a remote control system 3 can monitor the overall system correlation in order to detect and identify the background radiation source 4. The effect of the background radiation source 4 on the adaptable RPMs is symbolized by the arrows P1, P2 and P3, leading to a correlated background signal in the detectors of the RPMs 10.1, 10.2 and 10.3, which can be characterized by the processor 31 of the control system 3. In case a background radiation source 4 is identified, the processor 31 of the control system 3 can generate a system veto for preventing the trigger of an alarm.

Figure 8:
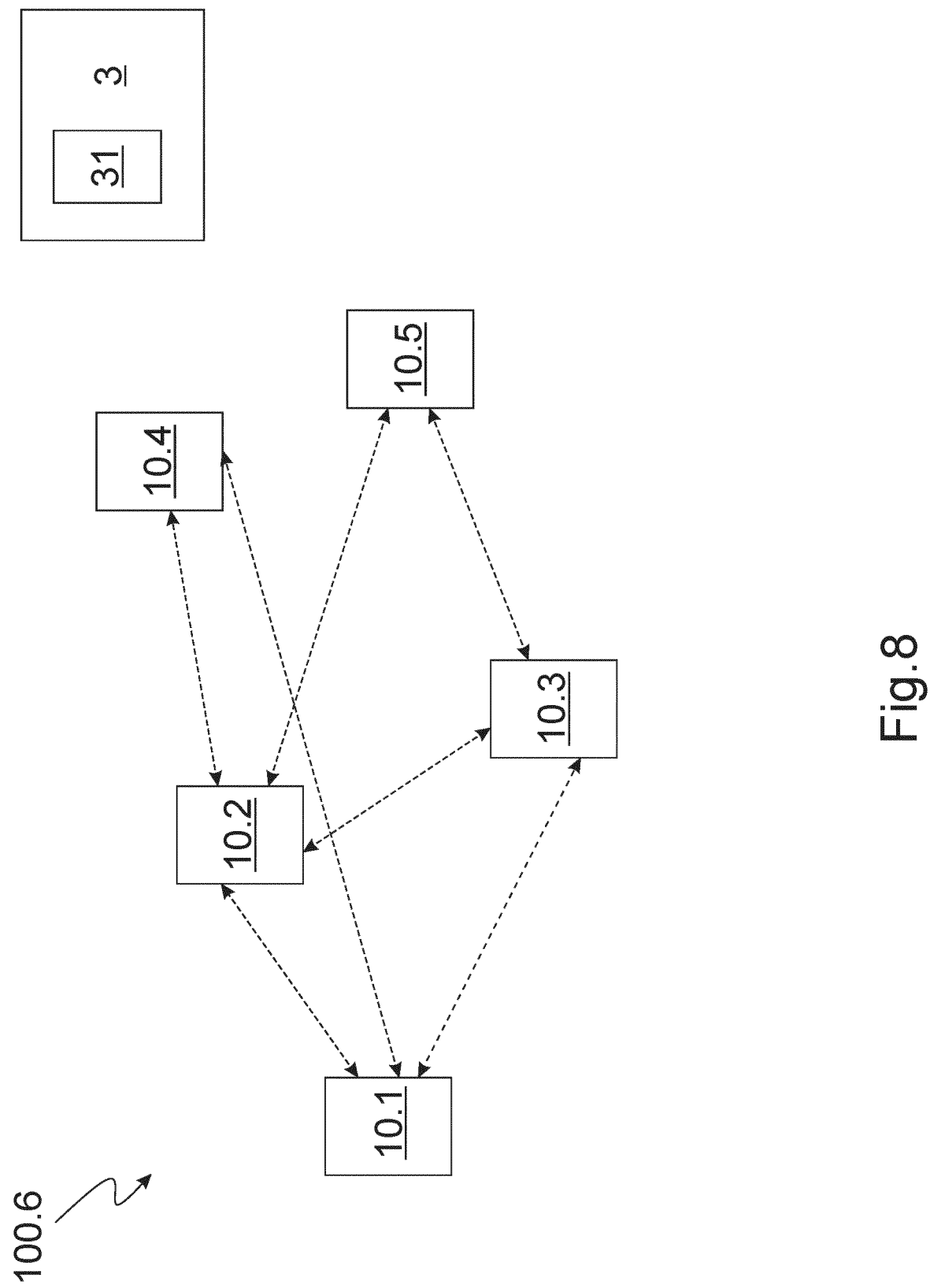
FIG. 8 shows an embodiment of an RPM system with distributed RPMs illustrating the cross-talk between the RPMs.

FIG. 8 shows an embodiment of an RPM system 100.6 with distributed RPMs 10.1-10.5 with dashed arrows illustrating the cross-talk between the detectors of the RPMs 10.1-10.5. Using a cross-talk matrix with cross-talk factors taking into account the cross-talk between the detectors of the RPMs 10.1-10.5. The RPMs 10.1-10.5 may for example be distributed over a large area of an airport with a plurality of pedestrians passing the RPMs 10.1-10.5. Using the cross-talk matrix, a processor 31 of a centralized control system 3 can characterize radiation sources detected by the detectors of the RPMs 10.1-10.5. Further, the RPMs 10.1-10.5 may comprise stationary RPMs or adaptable RPMs formed by selecting sets of detectors as described above.

Figure 9:
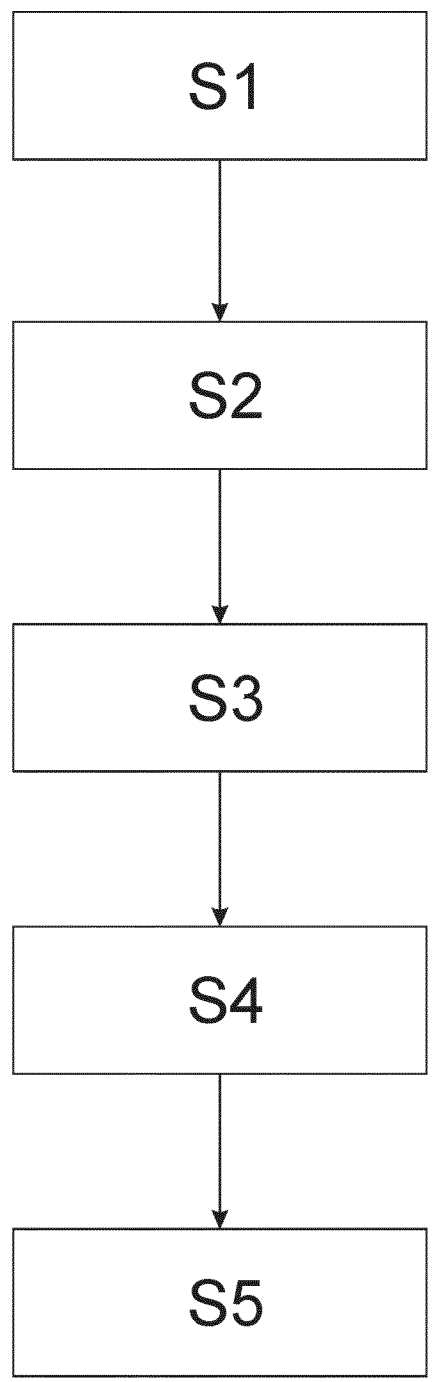
FIG. 9 shows a flow diagram of a sequence of steps of an embodiment of the method for characterizing a radiation source.

FIG. 9 shows a flow diagram of a sequence of steps S1-S5 of an embodiment of the method for characterizing a radiation source, especially of nuclear and/or radiological material in a container, vehicle, and/or on a person, by an RPM system as shown in one of the FIG. 1-8. In step S1, a processor of a control system assigns an identification address to each detector of the RPM system. In step S2, the processor of the control system selects a set of at least two detectors using the identification addresses, wherein the set of at least two detectors comprises at least one radiation detector together with at least one further radiation detector or with at least one ancillary sensor of the plurality of detectors of the RPM system. In step S3, the processor of the control system assigns an effective portal area to the selected set of detectors. In step S4, the processor of the control system receives via a communication network a detection signal generated by the detectors of the selected set, using the identification addresses of the detectors of the selected set. In step S5, the processor of the control system characterizes the radiation source associated with the effective portal area using the detection signal of the detectors of the selected set.

Figure 10:
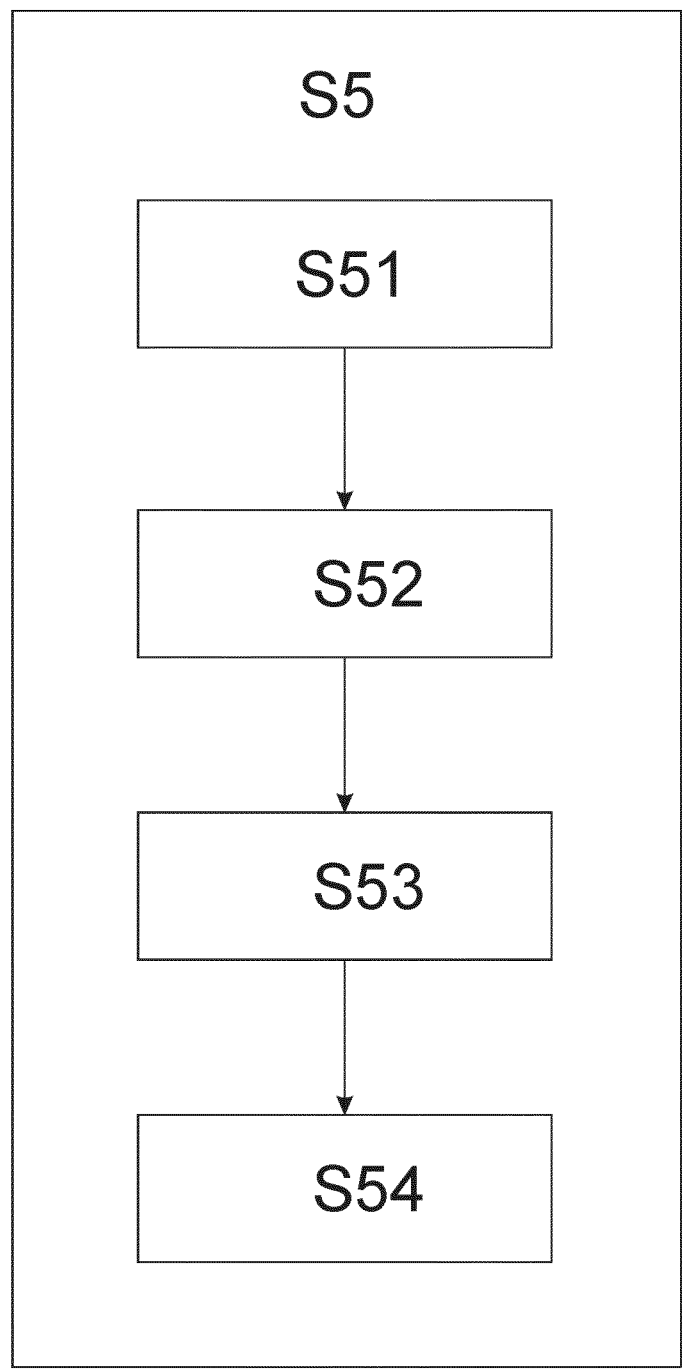
FIG. 10 shows a flow diagram of a sequence of steps of characterizing a radiation source.

FIG. 10 shows a flow diagram of a sequence of steps S51-S54 of characterizing a radiation source which are embodied as partial steps of the characterization step S5. The characterization of the radiation source includes processing detection signals by the processor of the control system by executing: Acquisition of, preferably preprocessed, detection signal of a radiation detector of the selected set in step S51, acquisition of, preferably preprocessed, detection signal of an ancillary sensor of the selected set in step S52, fusion of the detection signals of the radiation detector and the ancillary sensor and generation of an alarm information in step S53, displaying the alarm information on a user console in step S54.

Figure 11:
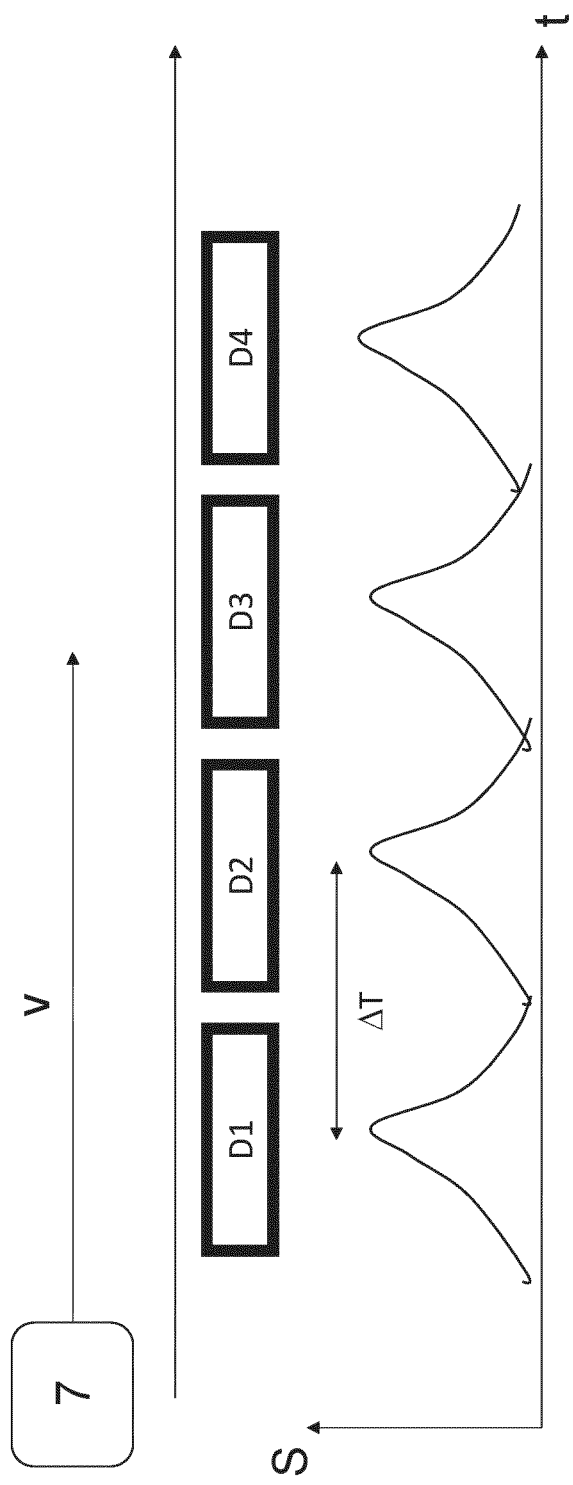
FIG. 11 shows a schematic illustration of a radiation source passing a series of radiation detectors with a certain velocity and a series of correlated signals detected by the radiation detectors.

FIG. 11 shows a schematic illustration of characterization of a radiation source 7 passing a series of radiation detectors D1-D4 with a certain velocity v. The detectors D1-D4 may each detect a radiation signal S which are spaced apart in time by a characteristic time ΔT. By fusing the velocity v, which may be sensed by an occupancy sensor, and the detected correlated radiation signals S, the processor of the control system may recognize whether the detected radiation signals S originate from the radiation source 7. If the processor of the control system detects that the signals S with the characteristic time ΔT do not conform with the velocity v of the radiation source 7, the processor may initiate an alarm. The radiation source 7 may for example be on a person passing a series of radiation detectors D1-D4. In another example, the radiation source 7 may be a transport good processed at a postal or logistic center. The transport good 7 may for example be transported by a conveyor belt with a certain velocity v and the detectors D1-D4 may be arranged at the conveyor belt. In some embodiments, the detectors D1-D4 may be segments of a single segmented detector. In particular, the radiation source 7 may be tracked by an object and/or person tracking system, providing spatial and/or temporal data on the radiation source 7, which spatial and/or temporal data may be fused with the radiation signals S.

LIST OF REFERENCE SYMBOLS 100.1-100.6 RPM system
10.1-10.5 RPMs
11a, 11b first unit, second unit or first pillar, second pillar
21a, 21b first unit, second unit
112b neutron detector
113b gamma detector
14a, 14b occupancy sensors
15 portal area, pedestrian portal area
1a environmental sensor
1b occupancy sensor
1c other peripheral device
1d gamma detector
1e neutron detector
1f digital and analog I/O-device
1g uninterruptable power system
1h camera
1i other directly IP addressable peripheral device
1j Ethernet switch
1k computer system
112a/b-114a/b components, radiation detectors, ancillary sensors
212a/b-214a/b components, radiation detectors, ancillary sensors
2 communication network
3 control system
31 processor
4 background radiation source
5 database
6 user console
7 radiation source
D1-D4 radiation detectors
V velocity
S radiation signal
t time
P1-P5 arrows
S1-S5 steps
S51-S54 steps

The invention claimed is:

1. A method for characterizing a radiation source; by a radiation portal monitoring system, the radiation portal monitoring system comprising a plurality of detectors including radiation detectors configured to detect ionizing radiation of the radiation source and to generate a detection signal responsive to detection of the ionizing radiation, and a control system comprising at least one processor, the method comprising the processor executing the steps of:
assigning an identification address to each detector;
selecting a set of at least two detectors using the identification addresses, wherein the set of at least two detectors comprises at least one radiation detector together with at least one further radiation detector or with at least one ancillary sensor of the plurality of detectors;
assigning an effective portal area to the selected set of detectors;
receiving via a communication network a detection signal generated by the detectors of the selected set, using the identification addresses of the detectors of the selected set;
storing a cross-talk matrix with entries representing cross-talk factors of the plurality of radiation detectors; and
characterizing the radiation source associated with the effective portal area using the detection signal of the detectors of the selected set and weighting detection signals from the radiation detectors using the cross-talk factors of the cross-talk matrix.

2. The method according to claim 1, wherein storing the cross-talk matrix includes storing position information of the radiation detectors and/or detector-type information as part of the cross-talk factors.

3. The method according to claim 1, wherein the method further comprises the processor selecting at least two different sets of detectors and characterizing the radiation source includes correlating the detection signals from the radiation detectors of the different selected sets.

4. The method according to claim 1, wherein the method further includes characterizing a background radiation from correlated signals of radiation detectors of multiple selected sets.

5. The method according to claim 1, wherein the method further comprises preprocessing the detection signal, wherein preprocessing the detection signal includes digitization of the detection signal of the detectors.

6. The method according to claim 1, wherein characterizing the radiation source by the control system includes processing detection signals by the processor by executing the following steps:
a. acquisition of detection signal of a radiation detector of the selected set,
b. acquisition of detection signal of the ancillary sensor of the selected set,
c. fusion of the detection signals of a. and b. and generation of an alarm information, and
d. displaying the alarm information on a user console.

7. The method according to claim 1, wherein selecting the set of at least two detectors includes selecting detectors to form a pedestrian portal area or a traffic portal area.

8. The method according to claim 1, wherein assigning an identification address to each detector includes assigning an Internet Protocol address to each detector.

9. The method according to claim 1, wherein the method characterizes a nuclear and/or radiological material in a container, vehicle, and/or on a person.

10. The method according to claim 1, wherein assigning an identification address to each detector includes assigning a private Internet Protocol address to each detector.

11. The method according to claim 1, wherein the method further comprises preprocessing the detection signal by a microcontroller arranged at the plurality of detectors, wherein preprocessing the detection signal includes digitization of the detection signal of the plurality of detectors.

12. The method according to claim 1, wherein characterizing the radiation source by the control system includes processing detection signals by the at least one processor by executing the following steps:
 a. acquisition of a preprocessed detection signal of a radiation detector of the selected set,
 b. acquisition of a preprocessed detection signal of the ancillary sensor of the selected set,
 c. fusion of the detection signals of a. and b. and generation of an alarm information, and
 d. displaying the alarm information on a user console.

13. A radiation portal characterizing a radiation source, the radiation portal monitoring system comprising
 a plurality of detectors including radiation detectors configured to detect ionizing radiation of the radiation source and to generate a detection signal responsive to detection of the ionizing radiation, the detectors each comprising a circuit configured for communication via a communication network;
 a control system configured to establish a communication connection to the detectors via the communication network and comprising at least one processor configured to:
  assign to each detector an identification address;
  select a set of at least two detectors using the identification addresses, wherein the set of at least two detectors comprises at least one radiation detector together with at least one further radiation detector or with at least one ancillary sensor of the plurality of detectors;
  assign an effective portal area to the selected set of detectors;
  receive via the communication network a detection signal generated by the detectors of the selected set, using the identification addresses of the detectors of the selected set;
  store a cross-talk matrix with entries representing cross-talk factors of the plurality of radiation detectors; and
  characterize the radiation source in the effective portal area using the detection signal of the detectors of the selected set and weighting detection signals from the radiation detectors using the cross-talk factors of the cross-talk matrix.

14. The radiation portal monitoring system according to claim 13, wherein the control system is a remotely arranged computer system.

15. The radiation portal monitoring system according to claim 13, wherein the control system is a cloud-based computer system.

16. The radiation portal monitoring system according to claim 13, wherein the radiation portal monitoring system comprises a hub, a switch or a router arranged at the detectors and configured to communicate with the circuits of the detectors and the processor of the control system via the communication network.

17. The radiation portal monitoring system according to claim 13, wherein the radiation portal monitoring system comprises the at least one ancillary sensor which is selected from at least one of: an occupancy sensor, alight detection and ranging sensor, a speed control sensor, weight sensor, a cargo weight sensor, an environmental sensor, a temperature sensor, humidity sensor, a power consumption sensor, or a door tampering sensor.

18. A computer program product comprising a non-transient computer-readable medium having stored thereon computer program code configured to control a processor of a control system of a radiation portal monitoring system for characterizing a radiation source the radiation portal monitoring system comprising a plurality of detectors including radiation detectors configured to detect ionizing radiation of the radiation source and to generate a detection signal responsive to detection of the ionizing radiation, the computer program code being configured to control the processor such that the processor performs the steps of:
 assigning an identification address to each detector;
 selecting a set of at least two detectors using the identification addresses, wherein the set of at least two detectors comprises at least one radiation detector together with at least one further radiation detector or with at least one ancillary sensor of the plurality of detectors;
 assigning an effective portal area to the selected set of detectors;
 receiving via a communication network a detection signal generated by the detectors of the selected set, using the identification addresses of the radiation detectors of the selected set;
 storing a cross-talk matrix with entries representing cross-talk factors of the plurality of radiation detectors; and
 characterizing the radiation source in the effective portal area using the detection signal of the detectors of the selected set and weighting detection signals from the radiation detectors using the cross-talk factors of the cross-talk matrix.

* * * * *

UNITED STATES PATENT AND TRADEMARK OFFICE
CERTIFICATE OF CORRECTION

PATENT NO. : 11,774,627 B2
APPLICATION NO. : 17/415807
DATED : October 3, 2023
INVENTOR(S) : Rico Chandrasekharan et al.

It is certified that error appears in the above-identified patent and that said Letters Patent is hereby corrected as shown below:

In the Claims

Column 14, Line 2, Claim 1, delete "source;" and insert -- source --

Column 15, Line 20, Claim 13, delete "portal" and insert -- portal monitoring system for --

Column 16, Line 16, Claim 17, delete "alight" and insert -- a light --

Column 16, Line 17, Claim 17, delete "weight" and insert -- a weight --

Column 16, Line 19, Claim 17, delete "humidity" and insert -- a humidity --

Column 16, Line 25, Claim 18, delete "source" and insert -- source, --

Signed and Sealed this
Twelfth Day of December, 2023

Katherine Kelly Vidal
*Director of the United States Patent and Trademark Office*